United States Patent [19]

Yamamoto et al.

[11] Patent Number: 5,322,889
[45] Date of Patent: Jun. 21, 1994

[54] COMPOSITE COMPOSITION HAVING HIGH TRANSPARENCY AND PROCESS FOR PRODUCING SAME

[75] Inventors: Naoki Yamamoto; Akira Nakata; Hiroki Hatakeyama; Hiroyuki Watanabe, all of Otake, Japan

[73] Assignee: Mitsubishi Rayon Co., Ltd., Tokyo, Japan

[21] Appl. No.: 948,578

[22] Filed: Sep. 23, 1992

[30] Foreign Application Priority Data

Sep. 24, 1991 [JP] Japan ................................. 3-243399
Sep. 24, 1991 [JP] Japan ................................. 3-243400

[51] Int. Cl.$^5$ ................................................ C08K 3/02
[52] U.S. Cl. .................................... 524/789; 524/791; 524/500; 526/194
[58] Field of Search ................. 524/789, 791, 500; 526/194

[56] References Cited

U.S. PATENT DOCUMENTS

| | | | |
|---|---|---|---|
| 4,772,660 | 9/1988 | Kitamura et al. | 524/789 X |
| 4,783,501 | 11/1988 | Sasaki et al. | 524/789 X |
| 4,810,734 | 3/1989 | Kawasumi et al. | 524/789 X |
| 4,910,251 | 3/1990 | Sasaki et al. | 524/789 X |
| 5,013,788 | 5/1991 | Nagashima et al. | 524/789 X |
| 5,102,948 | 4/1992 | Deguchi et al. | 524/789 |

FOREIGN PATENT DOCUMENTS 0220026  4/1987  European Pat. Off. .
0407867  1/1991  European Pat. Off. .
4020625  4/1991  Fed. Rep. of Germany .

OTHER PUBLICATIONS

Macromolecules, vol. 24, No. 19, Sep. 16, 1991, pp. 5481–5483, B. M. Novak, et al. "Inverse Organic-Inorganic Composite Materials.Free-Radical Routes into Non-Shrinking Sol-Gel Composites".

Primary Examiner—Judy M. Reddick
Attorney, Agent, or Firm—Oblon, Spivak, McClelland, Maier & Neustadt

[57] ABSTRACT

Disclosed is a composite composition obtained by polymerizing a radical-polymerizable vinyl compound (a) in the presence of a silicic acid oligomer (b) and, if desired, colloidal silica (c). This composite composition has high transparency, thermal resistance, rigidity and toughness and is hence useful in applications where inorganic glass has heretofore been used.

8 Claims, No Drawings

COMPOSITE COMPOSITION HAVING HIGH TRANSPARENCY AND PROCESS FOR PRODUCING SAME

BACKGROUND OF THE INVENTION a. Field of the Invention

This invention relates to composite compositions having high transparency, rigidity, toughness and thermal resistance.

b. Description of the Prior Art

Generally, organic polymers have low rigidity, hardness and thermal resistance. In an attempt to overcome this disadvantage, many investigations have heretofore been made on the formation of composite materials consisting of organic polymers and inorganic substances. For example, there have been proposed a number of methods in which a dispersion of a silica compound (formed by polycondensation of an alkoxysilane) or colloidal silica in an acrylic resin solution is used as a coating film for hardening the surfaces of plastic substrates (see, for example, Japanese Patent Laid-Open Nos. 11952/'78 and 11989/'78).

However, when such a composite material is coated on general-purpose plastic substrates, a coating film having high hardness and high wear resistance is obtained, but no substantial improvement in rigidity can be expected. Moreover, good transparency is obtained at coating film thicknesses of the order of several tens of microns, but a marked reduction in transparency results at greater coating film thicknesses.

On the other hand, it is described in J. Mater. Res., Vol. 4, p. 1018 (1989) that a silica gel-polymethyl methacrylate composite material having high transparency is obtained by impregnating porous silica gel having a controlled pore diameter with methyl methacrylate monomer and then polymerizing the latter. However, this method has the disadvantage that it involves troublesome steps and is not suitable for industrial purposes.

SUMMARY OF THE INVENTION

It is an object of the present invention to provide an organic polymer to which high rigidity and high thermal resistance have been imparted without impairing the high transparency, high toughness, low specific gravity and good workability inherently possessed by the organic polymer.

The present inventors made an intensive investigation with a view to achieving this purpose and, as a result, discovered that the intended purpose could be accomplished by mixing a radical-polymerizable vinyl compound and a silicic acid oligomer intimately and polymerizing the mixture to form a composite composition. The present invention has been completed on the basis of this discovery.

According to the present invention, there is provided a composite composition obtained by polymerizing a radical-polymerizable vinyl compound (a) in the presence of a silicic acid oligomer (b) and, if desired, colloidal silica (c).

Where colloidal silica (c) is not used, the silicic acid oligomer (b) mixed intimately with the radical-polymerizable vinyl compound (a) forms a silica skeleton during polymerization of the radical-polymerizable vinyl compound (a) and, furthermore, this silica skeleton and the resulting polymer of the radical-polymerizable vinyl compound (a) form a semi-interpenetrating network structure. Thus, the composite compositions of the present invention exhibit very good rigidity, toughness and thermal resistance.

In other words, the composite compositions of the present invention consists essentially of a polymer of the radical-polymerizable vinyl compound (a) and a polycondensate formed by further polycondensation of the silicic acid oligomer (b), both components (i.e., the polymer of the compound (a) and the polycondensate) being intermingled homogeneously.

Where colloidal silica (c) is additionally used, the colloidal silica particles dispersed uniformly in the radical-polymerizable vinyl compound (a) are bonded by the silicic acid oligomer (b) during the polymerization procedure and, furthermore, a semi-interpenetrating network structure is formed in the same manner as described above. Thus, the resulting composite compositions also exhibit good properties as described above.

DETAILED DESCRIPTION OF THE PREFERRED EMBODIMENTS

As the radical-polymerizable vinyl compound (a) used in the present invention, there may be employed a variety of well-known radical-polymerizable monomers. Useful radical-polymerizable monomers include, for example, methacrylic esters such as methyl methacrylate, ethyl methacrylate, butyl methacrylate and 2-ethylhexyl methacrylate; acrylic esters such as methyl acrylate, ethyl acrylate, butyl acrylate and 2-ethylhexyl acrylate; unsaturated carboxylic acids such as acrylic acid, methacrylic acid, maleic acid and itaconic acid; acid anhydrides such as maleic anhydride and itaconic anhydride; maleimide derivatives such as N-phenylmaleimide, N-cyclohexylmaleimide and N-t-butylmaleimide; hydroxyl-containing monomers such as 2-hydroxyethyl acrylate, 2-hydroxypropyl acrylate, 2-hydroxyethyl methacrylate and 2-hydroxypropyl methacrylate; nitrogen-containing monomers such as acrylamide, methacrylamide, acrylonitrile, methacrylonitrile, diacetone acrylamide and dimethylaminoethyl methacrylate; epoxy-containing monomers such as allyl glycidyl ether, glycidyl acrylate and glycidyl methacrylate; styrene monomers such as styrene and α-methylstyrene; and crosslinking agents such as ethylene glycol diacrylate, ethylene glycol dimethacrylate, allyl acrylate, allyl methacrylate, divinylbenzene and trimethylolpropane triacrylate. Among these monomers, radical-polymerizable vinyl compounds having a hydrophilic group and hence exhibiting good miscibility with silicic acid oligomers are preferred. Such hydrophilic groups include, for example, hydroxyl, carboxyl, tetrahydrofurfuryl, pyrrolidone and pyridine groups. Specific examples of such compounds are 2-hydroxyethyl acrylate, 2-hydroxypropyl acrylate, tetrahydrofurfuryl acrylate, 2-hydroxyethyl methacrylate, 2-hydroxypropyl methacrylate, tetrahydrofurfuryl methacrylate, vinylpyrrolidone, vinylpyridine, acrylic acid and methacrylic acid. Among them, compounds having a hydroxyl group are most preferred. Specific examples thereof are 2-hydroxyethyl acrylate, 2-hydroxypropyl acrylate, 2-hydroxyethyl methacrylate and 2-hydroxypropyl methacrylate.

As the silicic acid oligomer (b) used in the present invention, there may conveniently be employed silicic acid oligomers prepared from water glass or sodium metasilicate. The preparation of silicic acid oligomers from water glass or sodium metasilicate can be carried out according to any conventional procedure. For example, this can be accomplished by diluting water glass or sodium metasilicate with water and removing sodium ions with the aid of an ion exchange resin, or by diluting water glass or sodium metasilicate with water, acidifying this solution with an excess of hydrochloric acid, and then extracting the silicic acid oligomer with an organic solvent such as tetrahydrofuran.

The silicic acid oligomer (b) has a structure of straight, branched or ladder chain consisting of repeating unit of

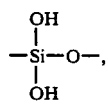

and is a partial polycondensate which has a molecular weight of from hundreds to tens of thousands. The molecular structure of the polycondensate is, for example, as follows:

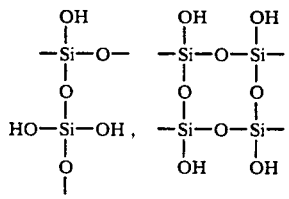

In the silicic acid oligomer (b) prepared from a silicate compound in the above-described manner, OH groups remain on the outer surfaces thereof. As described above, therefore, it is preferable from the viewpoint of miscibility with the silicic acid oligomer (b) to use a radical-polymerizable vinyl compound having a hydrophilic group as the component (a).

In the composite compositions of the present invention, the proportions of the radical-polymerizable vinyl compound (a) and the silicic acid oligomer (b) (on a solid basis) are preferably chosen so that the radical-polymerizable vinyl compound (a) and the silicic acid oligomer (b) are present in amounts of 1 to 99% by weight and 99 to 1% by weight, respectively. More preferably, the radical-polymerizable vinyl compound (a) and the silicic acid oligomer (b) are used in amounts of 10 to 90% by weight and 90 to 10% by weight, respectively. Most preferably, the radical-polymerizable vinyl compound (a) and the silicic acid oligomer (b) are used in amounts of 30 to 80% by weight and 70 to 20% by weight, respectively. When the silicic acid oligomer (b) is used in an amount of 10 to 90% by weight, the effects of the present invention can be produced to a full degree.

The composite compositions of the present invention can additionally contain colloidal silica (c). As colloidal silica (c), there may used a variety of commercial products. The average particle diameter of colloidal silica (c) usually ranges from 1 nm to 1 $\mu$m, but no particular limitation is placed on its average particle diameter. However, preferred average particle diameters are within the range of 5 to 500 nm.

Although no particular limitation is placed on the dispersion medium for colloidal silica (c), water, alcohols (such as methanol and isopropyl alcohol), cellosolves, dimethylacetamide and the like are usually used. Especially preferred dispersion media are alcohols, cellosolves and water.

Where the composite compositions of the present invention contain colloidal silica (c), no particular limitation is placed on the proportions of the various components. However, the radical-polymerizable vinyl compound (a) is preferably used in an amount of 5 to 1,000 parts by weight, more preferably 20 to 200 parts by weight, per 100 parks by weight (on a solid basis) of colloidal silica (c), and the silicic acid oligomer (b) is preferably used in an amount (on a solid basis) of 5 to 100 parts by weight, more preferably 10 to 50 parts by weight, per 100 parts by weight (on a solid basis) of colloidal silica (c).

Even when the $SiO_2$ content is 10% by weight or greater, the composite compositions of the present invention have a haze of not greater than 5% as measured at a plate thickness of 3 mm. In electron micrographs, no fine silica particles are observed at even at a magnification of 200,000 diameters. This means that, in the composite compositions of the present invention, the polymer of the radical-polymerizable vinyl compound (a) is incorporated in the silica skeleton formed from the silicic acid oligomer (b) and both of them are intermingled on a molecular level, thus permitting the achievement of high transparency. In composite compositions having commercially available ordinary fine silica particles dispersed therein, their haze as measured at a plate thickness of 3 mm is unduly high at $SiO_2$ contents of 10% by weight or greater. Moreover, fine silica particles are clearly recognized in electron micrographs at a magnification of the order of several thousand diameters.

Even where the composite compositions of the present invention contain colloidal silica (c), electron micrographs reveal that colloidal silica particles are very uniformly dispersed without suffering agglomeration. This means that, in the composite compositions of the present invention, colloidal silica particles are incorporated in the silica skeleton formed from the silicic acid oligomer (b) and intermingled with the polymer of the radical-polymerizable vinyl compound (a) on a molecular level, thus permitting the achievement of high transparency.

Although no particular limitation is placed on the method by which the composite compositions of the present invention are produced, it is preferable to produce them according to the conventionally known cast polymerization process. By way of example, a casting material is first prepared by mixing the radical-polymerizable vinyl compound (a), in the form of a monomer or a partial polymer, with the silicic acid oligomer (b) and then adding a desired radical polymerization initiator to the resulting mixed solution. The mixing of both components is carried out, for example, by mixing the component (a) directly with a solution of the silicic acid oligomer (b) and then removing the solvent, or by adding the component (a) to a solution of the silicic acid oligomer (b) while removing therefrom the solvent for the component (b). Thus, all or a part of the solvent is replaced by the component (a). In other words, it is important to prepare a mixed solution of both components without causing the component (b) to separate out as a solid. It is to be understood that the above-described mixed solution can have any viscosity, so long as the component (b) is homogeneously dissolved in the component (a). For example, the mixed solution may have the form of a gel-like material.

No particular limitation is placed on the solvent for the silicic acid oligomer (b), so long as the solvent can be replaced by the component (a) as stated above. It is, for example, water soluble ethers such as tetrahydrofuran and dioxane; and alcohols such as tert-butyl-alcohol and isopropyl alcohol.

Where the composite compositions of the present invention contain colloidal silica (c), they are produced by effecting polycondensation of silicic acid oligomer (b) in the presence of colloidal silica (c) to form a silica polycondensate, and then mixing the component (a) and distilling off solvent or adding the component (a) while distilling off solvent, and then effecting radical polymerization.

They are preferably produced by mixing the radical-polymerizable vinyl compound (a), in a desired state and polymerizing them concurrently. Alternatively, they may be produced by partially polymerizing the radical-polymerizable vinyl compound (a) in advance, mixing this partial polymer of the radical-polymerizable vinyl compound (a) and polymerizing them.

Also in this case, the composite compositions of the present invention can be produced according to the conventionally known cast polymerization process. As stated above, all or a part of the solvent is replaced by the component (a). Also in this case, it is important to prepare a mixed solution without causing the component (b) to separate out as a solid.

The radical polymerization initiators which can be used for this purpose include, for example, azo compounds such as 2,2'-azobisisobutyronitrile, 2,2'-azobis(2,4-dimethylvaleronitrile) and 2,2'-azobis(2,4-dimethyl-4-methoxyvaleronitrile); organic peroxides such as benzoyl peroxide and lauroyl peroxide; and redox polymerization initiators.

This casting material can be cast-polymerized by the cell casting process in which a cell is formed by two surface-treated inorganic glass or metal plates disposed in opposed relationship and sealed with a gasket at their periphery, and the casting material is poured into the cell and heated; or the continuous casting process in which a casting space is defined by two stainless steel endless belts having one mirror-polished surface and traveling in the same direction at the same speed, and two gaskets disposed along the edges of the belts, and the above-described casting material is continuously poured into the casting space from the upstream side and heated. The polymerization temperature at which the composite compositions of the present invention are produced is usually within the range of 40° to 150° C.

Furthermore, in any convenient step of the present process, various additives such as colorants, ultraviolet absorbers, thermal stabilizers and mold releasing agents may be incorporated in the composite composition in such amounts as not to impair the effects of the present invention.

As described above, the present invention provides composite compositions having high transparency, thermal resistance, rigidity and toughness. These composite compositions are useful in various applications where inorganic glass has heretofore been used, such as windowpanes for houses and vehicles.

The present invention is more specifically explained with reference to the following examples. However, it is to be understood that the present invention is not limited thereto. In these examples, all parts are by weight unless otherwise stated.

Transparency was evaluated by using an integrating sphere type haze meter (SEP-H-SS; manufactured by Japan Precision Optics Co., Ltd.) to measure the total light transmittance and haze of a sample according to ASTM D1003. Thermal resistance was evaluated by annealing a sample and then measuring its heat distortion temperature (HDT) according to ASTM D648. Strength was evaluated by annealing a sample at 130° C. for 60 hours and then making a bending test of the sample according to ASTM D790 to determine its flexural breaking strength and flexural modulus of elasticity.

SYNTHESIS EXAMPLE

While a solution of 1,000 parts of 36% hydrochloric acid in 2,000 parts of deionized water was kept at 20 C, a solution of 1,200 parts of sodium metasilicate nonahydrate in 3,000 parts of deionized water was added dropwise thereto. After completion of the addition, the mixture was stirred at room temperature for 1.5 hours. Then, 3,000 parts of tetrahydrofuran and 1,800 parts of sodium chloride were added and the resulting mixture was vigorously stirred for an hour. Thereafter, the mixture was allowed to stand. The upper layer (organic phase) was separated and dried by the addition of 600 parts of anhydrous sodium sulfate. After the solid matter was removed by filtration, the filtrate was concentrated under reduced pressure to obtain a tetrahydrofuran solution of silicic acid oligomer (with a solid content of 20% by weight).

EXAMPLE 1

A glass flask fitted with agitating blades was charged with 200 parts of the tetrahydrofuran solution of silicic acid oligomer (with a solid content of 20% by weight) obtained in Synthesis Example and 160 parts of 2-hydroxyethyl methacrylate (hereinafter abbreviated as HEMA). After the contents of the flask were stirred for an hour, the volatile components were completely distilled off under reduced pressure by means of a vacuum pump. Thus, there was obtained a mixed solution having a total amount of 200 parts (a solid content i.e., silica content of 20% by weight).

Then, 0.15 part of 2,2'-azobisisobutyronitrile (hereinafter abbreviated as AIBN) as a polymerization initiator was added to and dissolved in 150 parts of the above mixed solution. After the mixed solution was exposed to reduced pressure in order to remove any dissolved air, it was poured into a cell formed by a gasket and two stainless steel plates and adjusted previously so as to have a thickness of 3 mm. Subsequently, the mixed solution was polymerized at 80° C. for 2 hours and then at 130° C. for 2 hours to obtain a cast plate. Properties of this cast plate were evaluated and the results thus obtained are shown in Table 1.

EXAMPLES 2-4

Cast plates were obtained in exactly the same manner as described in Example 1, except that the type and amount of the radical-polymerizable vinyl compound (a), the amount of the tetrahydrofuran solution of silicic acid oligomer (b) obtained in Synthesis Example, and the solid content of the mixed solution were altered as shown in Table 1. Properties of these cast plates were evaluated and the results thus obtained are shown in Table 1.

COMPARATIVE EXAMPLE 1

0.15 part of AIBN was dissolved in 150 parts of HEMA. This mixture was polymerized in the same manner as described in Example 1 to obtain a cast plate. Properties of this cast plate were evaluated and the results thus obtained are shown in Table 1.

COMPARATIVE EXAMPLE 2

40 parts of fine silica powder having an average particle diameter of 16 nm (commercially available from Nippon Aerosil Co., Ltd. under the trade name of Aerosil R-972) was added to 160 parts of HEMA with stirring and uniformly dispersed therein.

Then, 0.15 part of AIBN was dissolved in 150 parts of the above solution. Thereafter, the mixed solution was polymerized in exactly the same manner as described in Example 1 to obtain a cast plate. Properties of this cast plate were evaluated and the results thus obtained are shown in Table 1.

EXAMPLE 5

A glass flask fitted with agitating blades was charged with 75 parts of the tetrahydrofuran solution of silicic acid oligomer (with a solid content of 20% by weight) obtained in Synthesis Example, and 200 parts of colloidal silica dispersed in isopropyl alcohol so as to have a silica content of 30% by weight (commercially available from Catalyst Chemical Industry Co., Ltd. under the trade name of OSCAL-1432). The contents of the flask were stirred at room temperature for an hour, followed by the addition of 90 parts of HEMA. Thereafter, the volatile components were distilled off at 40° C. under reduced pressure by means of a rotary evaporator, while methyl methacrylate (hereinafter abbreviated as MMA) was added at the same rate as the volatile components were distilled off. Finally, the solvent was completely replaced by MMA and the resulting mixed solution was concentrated to a total amount of 185 parts (a solid content i.e., silica content of 40% by weight).

Then, 0.15 part of AIBN was added to 150 parts of the above mixed solution. Thereafter, the mixed solution was polymerized in exactly the same manner as described in Example 1 to obtain a cast plate. Properties of this cast plate were evaluated and the results thus obtained are shown in Table 2.

EXAMPLE 6

A glass flask fitted with agitating blades was charged with 75 parts of the tetrahydrofuran solution of silicic acid oligomer (with a solid content of 20% by weight) obtained in Synthesis Example, and 200 parts of the same isopropyl alcohol-dispersed colloidal silica as used in Example 5. The contents of the flask were stirred at room temperature for an hour, followed by the addition of 110 parts of HEMA. Thereafter, the volatile components were completely distilled off by means of a vacuum pump. Thus, there was obtained a mixed solution having a total amount of 185 parts (a solid content of 40% by weight).

Then, 0.15 part of AIBN was added to 150 parts of the above mixed solution. Thereafter, the mixed solution was polymerized in exactly the same manner as described in Example 1 to obtain a cast plate. Properties of this cast plate were evaluated and the results thus obtained are shown in Table 2.

EXAMPLE 7

A glass flask fitted with agitating blades was charged with 75 parts of the tetrahydrofuran solution of silicic acid oligomer (with a solid content of 20% by weight) obtained in Synthesis Example, 300 parts of colloidal silica dispersed in water so as to have a silica content of 20% by weight (commercially available from Nissan Chemical Industries, Ltd. under the trade name of Snowtex-O). The contents of the flask were stirred at room temperature for an hour, followed by the addition of 110 parts of HEMA. After 150 parts of ethyl cellosolve was added in order to form an azeotropic mixture with water, the volatile components were distilled off at 40° C. under reduced pressure by means of a rotary evaporator and, furthermore, completely distilled off by means of a vacuum pump. Thus, there was obtained a mixed solution having a total amount of 185 parts (a solid content of 40% by weight).

Then, 0.15 part of AIBN was added to 150 parts of the above mixed solution. Thereafter, the mixed solution was polymerized in exactly the same manner as described in Example 1 to obtain a cast plate. Properties of this cast plate were evaluated and the results thus obtained are shown in Table 2.

EXAMPLES 8 AND 9

Cast plates were obtained in exactly the same manner as described in Example 5, except that the types and amounts of the radical-polymerizable vinyl compound (a) and colloidal silica, the amount of the tetrahydrofuran solution of silicic acid oligomer (b) obtained in Synthesis Example, and the solid content of the mixed solution were altered as shown in Table 2. Properties of these cast plates were evaluated and the results thus obtained are shown in Table 2.

TABLE 1

| Example No. | Radical-polymerizable vinyl compound (a) Type | Radical-polymerizable vinyl compound (a) Amount (parts) | Silicic acid oligomer (b) solution[1] (parts) | Solid content (wt. %) | Total light transmittance (%) | Haze (%) | HDT (°C.) | Flexural breaking strength (kg/cm$^2$) | Flexural modulus of elasticity (kg/cm$^2$) |
|---|---|---|---|---|---|---|---|---|---|
| Example 1 | HEMA | 160 | 200 | 20 | 92.5 | 1.9 | 185 | 1,220 | 5.5 × 10$^4$ |
| Example 2 | HEMA | 120 | 400 | 40 | 92.4 | 2.0 | 205 | 1,200 | 8.4 × 10$^4$ |
| Example 3 | HEMA MMA[2] | 120 40 | 200 | 20 | 92.4 | 3.8 | 187 | 1,200 | 5.8 × 10$^4$ |
| Example 4 | HEMA | 180 | 100 | 10 | 92.8 | 1.7 | 146 | 1,220 | 4.7 × 10$^4$ |
| Comparative Example 1 | HEMA | 150 | — | — | 92.1 | 1.3 | 55 | 1,200 | 3.3 × 10$^4$ |
| Comparative Example 2 | HEMA | 160 | Aerosil, 40 | 20 | 78.9 | 35.2 | 109 | 500 | 4.4 × 10$^4$ |

[1] A tetrahydrofuran solution (with a solid content of 20% by weight)
[2] MMA = Methyl methacrylate

COMPARATIVE EXAMPLE 3

An attempt was made to replace the solvent bye and thereby obtain a solution having a solid content of 30% by weight. Specifically, using 100 parts of the same isopropyl alcohol-dispersed colloidal silica as used in Example 5, the volatile components were distilled off therefrom at 40° C. under reduced pressure by means of a rotary evaporator, while MMA was added at the same rate as the volatile components were distilled off. However, before the solvent was completely replaced by MMA, the solution showed an abrupt increase in viscosity and formed a gel, which made it impossible to subject the solution to the polymerization procedure.

TABLE 2

| Example No. | Radical-polymerizable vinyl compound (a) Type | Amount (parts) | Colloidal silica Type | Amount (parts) | Silicic acid oligomer (b) solution*[1] (parts) | Solid content (wt. %) | Total light transmittance (%) | Haze (%) | HDT (°C.) | Flexural breaking strength (kg/cm$^2$) | Flexural modulus of elasticity (kg/cm$^2$) |
|---|---|---|---|---|---|---|---|---|---|---|---|
| Example 5 | HEMA<br>MMA | 90<br>25 | S-1 | 200 | 75 | 40 | 92.6 | 2.7 | 185 | 1,220 | 4.8 × 10$^4$ |
| Example 6 | HEMA | 110 | S-1 | 200 | 75 | 40 | 92.6 | 2.5 | 178 | 1,200 | 4.4 × 10$^4$ |
| Example 7 | HEMA | 110 | S-2 | 300 | 75 | 40 | 92.4 | 2.8 | 175 | 1,200 | 6.0 × 10$^4$ |
| Example 8 | HEMA<br>MMA | 90<br>25 | S-1 | 200 | 30 | 40 | 92.8 | 2.5 | 182 | 1,200 | 5.7 × 10$^4$ |
| Example 9 | HEMA<br>MMA | 270<br>30 | S-1 | 200 | 150 | 30 | 92.3 | 1.9 | 170 | 1,230 | 5.6 × 10$^4$ |

*[1] A tetrahydrofuran solution (with a solid content of 20% by weight)
S-1: Colloidal silica dispersed in isopropyl alcohol so as to have a silica content of 30% by weight (commercially available from Catalyst Chemical Industry Co., Ltd. under the trade name of OSCAL-1432)
S-2: Colloidal silica dispersed in water so as to have a silica content of 20% by weight (commercially available from Nissan Chemical Industries, Ltd. under the trade name of Snowtex-O)

What is claimed is:

1. A composite composition obtained by polymerizing a radical-polymerizable vinyl compound (a) that is at least one compound selected from the group consisting of methacrylic esters, acrylic esters, unsaturated carboxylic acids, acid anhydrides, maleimide derivatives, hydroxyl-containing monomers, nitrogen-containing monomers, epoxy-containing monomers, styrene monomers, and crosslinking agents, in the presence of a silicic polycondensate which is obtained by polycondensation of silicic acid oligomer (b) in the presence of colloidal silica (c).

2. A composite composition as claimed in claim 1 wherein the radical-polymerizable vinyl compound (a) of a radical-polymerizable vinyl compound having a hydrophilic group.

3. A composite composition as claimed in claim 1 wherein the silicic acid oligomer (b) is prepared from a water solution of alkali silicate or sodium metasilicate.

4. A composite composition as claimed in claim 1 which has a SiO$_2$ content of not less than 10% by weight and a haze of not greater than 5% as measured at a plate thickness of 3 mm.

5. A process for producing composite compositions which comprises the steps of preparing a mixed solution containing a silicic polycondensate obtained by polycondensation of silicic acid oligomer (b) in the presence of colloidal silica (c) and a radical-polymerizable vinyl compound (a) that is at least one compound selected from the group consisting of methacrylic esters, acrylic esters, unsaturated carboxylic acids, acid anhydrides, maleimide derivatives, hydroxyl-containing monomers, nitrogen-containing monomers, epoxy-containing monomers, styrene monomers, and crosslinking agents, or a partial polymer thereof; and effecting radical polymerizable of the mixed solution.

6. A process for producing composite compositions as claimed in claim 5 wherein the radical polymerization of the mixed solution and the polycondensation of the silicic acid oligomer (b) are effected at a temperature of 40° to 150° C.

7. A process for producing composite compositions as claimed in claim 5 wherein the mixed solution is prepared by mixing the component (a) with a solution of the silicic polycondensate and solvent, said silicic polycondensate thereby dissolving in said solvent, and then distilling off the solvent from the resulting mixture.

8. A process for producing composite compositions as claimed in claim 5 wherein the mixed solution is prepared by adding the component (a) to a solution of the silicic polycondensate and a solvent, said silicic polycondensate thereby dissolving in said solvent, and simultaneously distilling off the solvent therefrom.

* * * * *

UNITED STATES PATENT AND TRADEMARK OFFICE
CERTIFICATE OF CORRECTION

PATENT NO. : 5,322,889

DATED : June 21, 1994

INVENTOR(S) : NAOKI YAMAMOTO ET AL

It is certified that error appears in the above-identified patent and that said Letters Patent is hereby corrected as shown below:

| COL. | LINE | |
|---|---|---|
| 4, | 9, | delete "parks" and insert --parts--; |
| 9, | 2, | delete "bye" and insert --by MMA--; |
| 9, | 47, | insert --consists-- after "(a)"; |
| 10, | 33-34, | delete "polymerizable" and insert -- polymerization--; |
| 10, | 43, | insert --a-- after "and". |

Signed and Sealed this

Ninth Day of May, 1995

Attest:

*Attesting Officer*

BRUCE LEHMAN

*Commissioner of Patents and Trademarks*